United States Patent
Kulaga et al.

(10) Patent No.: US 9,497,223 B2
(45) Date of Patent: Nov. 15, 2016

(54) SYSTEM AND METHOD FOR CONFIGURING A COMPUTER SYSTEM ACCORDING TO SECURITY POLICIES

(71) Applicant: Kaspersky Lab, ZAO, Moscow (RU)

(72) Inventors: Andrey A. Kulaga, Moscow (RU); Andrey A. Pravdivy, Moscow (RU); Denis A. Minchenko, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 14/492,002

(22) Filed: Sep. 20, 2014

(65) Prior Publication Data
US 2016/0088018 A1    Mar. 24, 2016

(51) Int. Cl.
*H04L 29/06* (2006.01)
*H04L 12/24* (2006.01)
*G06F 21/50* (2013.01)

(52) U.S. Cl.
CPC ............... *H04L 63/20* (2013.01); *G06F 21/50* (2013.01); *H04L 41/0853* (2013.01); *H04L 63/1433* (2013.01); *H04L 63/1441* (2013.01)

(58) Field of Classification Search
CPC ... H04L 63/20; H04L 63/10; H04L 63/0227; H04L 63/08; G06F 21/6218
See application file for complete search history.

(56) References Cited

U.S. PATENT DOCUMENTS

| 5,164,988 | A | 11/1992 | Matyas et al. |
|---|---|---|---|
| 6,732,367 | B1 | 5/2004 | Ellis |
| 6,799,197 | B1 | 9/2004 | Shetty et al. |
| 7,472,422 | B1 | 12/2008 | Agbabian |
| 7,592,906 | B1 * | 9/2009 | Hanna ..................... H04L 63/20 340/506 |
| 7,665,125 | B2 | 2/2010 | Heard et al. |
| 8,024,449 | B1 | 9/2011 | Shiyafetdinov |
| 8,024,450 | B1 | 9/2011 | Shiyafetdinov |
| 8,209,740 | B1 * | 6/2012 | Kulaga ............... H04L 41/0853 713/156 |
| 8,412,925 | B2 * | 4/2013 | Ennis et al. ................. 713/100 |
| 8,433,792 | B2 | 4/2013 | Kulaga et al. |
| 8,707,385 | B2 * | 4/2014 | Jain et al. ......................... 726/1 |
| 8,806,009 | B2 | 8/2014 | Kulaga et al. |
| 2003/0234808 | A1 | 12/2003 | Huang et al. |
| 2005/0256961 | A1 * | 11/2005 | Alon et al. .................... 709/229 |
| 2010/0175104 | A1 * | 7/2010 | Khalid ............... 726/1 |
| 2012/0216028 | A1 * | 8/2012 | Amini et al. ................. 713/100 |
| 2013/0247169 | A1 * | 9/2013 | Harrison et al. ................. 726/12 |
| 2013/0254524 | A1 * | 9/2013 | Snapir et al. ................. 713/100 |
| 2014/0137184 | A1 | 5/2014 | Russello et al. |
| 2014/0189783 | A1 * | 7/2014 | Kapoor et al. .................... 726/1 |

\* cited by examiner

*Primary Examiner* — Fatoumata Traore
(74) *Attorney, Agent, or Firm* — Bardmesser Law Group

(57) ABSTRACT

Method and system for configuration of a computer system according to security policies. The configuration of an employee's personal computer system according to the security policies of the corporate network provides for security of access to the corporate network. Configuration change instructions are generated according to the security policy and applied to the configuration of the computer system. The configuration system includes at least one computer system used to access a corporate network, a policy application module configured to determine configuration parameters of the computer system and to pass the configuration data to an instruction forming module. The computer system is configured according to the selected security policy by execution of at least one configuration change instruction. The configuration system also includes a database of security policies.

12 Claims, 3 Drawing Sheets

SYSTEM AND METHOD FOR CONFIGURING A COMPUTER SYSTEM ACCORDING TO SECURITY POLICIES

BACKGROUND OF THE INVENTION

Field of the Invention

The present invention is related to application of security policies and, in particular, to a method and system for configuring a computer system according to the security policies.

Description of the Related Art

Personal computer systems and workstations are used for work in the office. This can impose some security risks on the enterprise network. In order to safely integrate employee's computer systems into the network of the enterprise, data access has to be separated and limited. The separation of data access is usually implemented by security policies. However, application of the security policies on a computer system requires a number of actions.

For example, the security policies may require installation or removal of certain application(s), switching off or turning on a particular device (e.g., Bluetooth adapter), configuration of connection/session parameters or configuration of applications and devices. Often, even experienced employees cannot (or do not want to bother to) perform the above actions on their personal computer system according to the security policies' requirements of the enterprise. A large number of device vendors and applications, and complexity of configurations and limited access to configuration data make configuration of employee's personal computer system rather difficult, if not impossible.

Additionally, a current state of the computer system has to be taken into consideration. If a computer system has a number of applications and configurations that are actually required by the security policies, the process of computer system configuration according to the enterprise security policies can be simplified. There are a number of conventional solutions used for optimization of application of security policies.

For example, U.S. Pat. No. 6,799,197 describes a procedure for implementing a security policy on the computer system. The application of the security policy is implemented by an agent and a server controlling the security policies. In order to implement a security policy, an installation package is formed. The installation package is then installed on the device. Control of the security policies is implemented over a public network, Internet or email. However, this reference does not describe an algorithm for generating packages and instructions for changing configuration of a target computer. Additionally, it relies on a required presence of an installed agent application.

U.S. Pat. No. 7,665,125 provides an algorithm for determining and implementing a security policy on a mobile computer system based on user-related data. A server (or a web server) determines a security policy and a role of the mobile computer system for a user. Then, an agent installs and configures applications according to the security policy using installation packages for security policies. However, the conventional solutions provide for only partial simplification of configuration of a computer system according to requirements of the security policy.

Accordingly, a method and system for efficient configuration of a computer system according to the security policy is desired.

SUMMARY OF THE INVENTION

The present invention is related to application of security policies and, in particular, to a method and system for configuring a computer system according to the security policies that substantially overcomes the disadvantages of the related art.

According to the exemplary embodiment, a method, system and computer program product for configuration of a computer system according to the security policies is provided. The configuration of an employee's personal computer system according to the security policies of the corporate network provides for security of access to the corporate network. Configuration change instructions are generated according to the security policy and applied to the configuration of the computer system.

According to the exemplary embodiment, a configuration system includes at least one computer system used to access a corporate network, a policy application module configured to determine configuration parameters of the computer system and to pass the configuration data to an instruction forming module. The computer system is configured according to the selected security policy by execution of at least one configuration change instruction. The configuration system also includes a database of security policies. The instruction forming module selects a security policy for a given computer system based on the configuration of the computer system and the security policies stored in the database.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

In most cases, all of the computer systems used by employees need to be configured according to the security policies. The employees who do not have their computer systems configured accordingly should not have a full (or even partial) access to the corporate network. In order to configure an employee's personal computer system, a system for configuration according to the security policy(ies) is used, as described below.

A security policy is a set of security rules and procedures that regulate protection and distribution of critical data.

Figure 1:
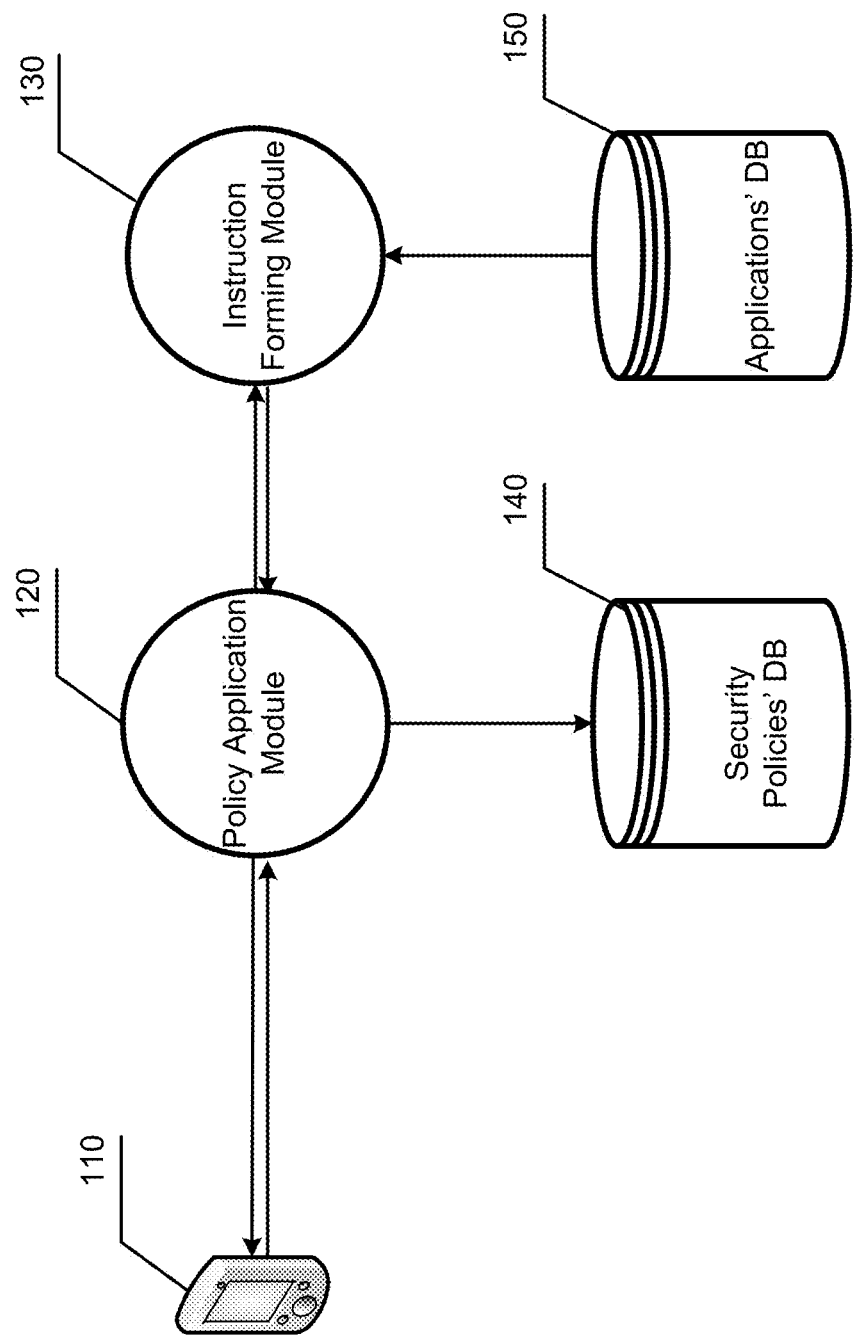
FIG. 1 illustrates an architecture of a system for configuration of a computer system according to the security policies, in accordance with the exemplary embodiment.

FIG. 1 illustrates an architecture of a system for configuration of a computer system according to the security policies, in accordance with the exemplary embodiment. The configuration system includes at least one computer system 110 used to access a corporate network, a policy application module 120 configured to determine configuration parameters of the computer system 110 and to pass the configuration data to an instruction forming module 130. The computer system 110 is configured according to the selected security policy by execution of at least one configuration change instruction. The configuration system also includes a database 140 of security policies. The instruction forming module selects a security policy for a given computer system based on the configuration of the computer system and the security policies stored in the database 140. The system also includes a database of applications 150.

A user begins to work with his computer system 110 and attempts to access a corporate network. The policy application module 120 determines the configuration of the computer system 110. The policy application module 120 sends data reflecting the configuration of the computer system 110 to the instruction forming module 130. The policy application module 120 configures the computer system 110 according to a selected security policy by execution of at least one configuration change instruction. Thus, as soon as the user of the computer system 110 attempts to access the corporate network, the policy application module 120 initiates determination of the configuration of the computers system 110.

applications have to local data and resources, access rights the applications have to shared (remote) data and resources, antivirus settings, spam/firewall settings, rights to access external devices (e.g., USB/Firewire devices), and which ones, etc. Also the state can include configurations of devices—e.g., network cards and USB devices.

In one embodiment, the policy application module 120 sends to the computer system 110 a message containing a link for determination of type and state of the computer system. The user clicks on the link in order to configure the computer system 110 in order to access a corporate network. The configuration link can be a part of an email message, SMS, MMS, etc. The link can reference an element (i.e., command, text, header, comment, image, etc.) inside the message. The link can also reference another object (i.e., file, archive or application) located on a local disk or on a network resource. The link can also point to a particular object element(s). The link can contain command for calling scripts, applications, libraries or plug-ins built into a browser or used by the OS. Note that the link can also be accessed by the policy application module.

The policy application module 120 downloads a control application, which determines the configuration of the computer system. In one embodiment, the policy application module 120 goes to the page referenced by the link and launches the scripts on the page. The scripts determine the configuration of the computer system 110. In one embodiment, the policy application module 120 executes at least one configuration change instruction using the control application.

According to the exemplary embodiment, the control application controls computer system configuration process according to security policy requirements. The control application can be a part of the policy application module 120.

| Type of computer system | Type of OS | User | Rule | Security policy specifications | Additional information |
|---|---|---|---|---|---|
| Desktop | Microsoft Windows 7 | Not authorized | Desktop + MW 7 + Not Authorized = Unauthorized guest. | Unauthorized guest policy: List of important software for For Microsoft Windows 7: OS version: 6.1.7601.22616 Last updates installed (monthly) At least Microsoft Office 2010 Standard Microsoft Visio 2010 (14.0.7122.500) Microsoft Lync 4.0.7557.4446 List of hardware configuration: Disabled wired connection. | For users that have no personal policy |
| IPhone | iOS 6 | HR/Mikhailov | IPhone + iOS6 + P + HR = HR mobile | HR mobile: List of important software: iOS 6.1.6, Skype, Acrobat Reader, OpenOffice List of hardware configuration: Disabled GSM, LTE, Disabled Bluetooth, Enabled Wi-Fi. | For human resources staff. |

The system configuration can include a computer system type, state of the installed applications and connected devices. The computer system type can be, for example, virtual (e.g., a Virtual Machine), mobile, stationary, etc. The state of the computer system can include a state and a version of the OS, versions of the installed applications, presence of plug-ins, network access rights of particular components, configurations of applications, access rights the The control application can collect data reflecting the type and the state of the computer system 110 and provide this data to the instruction forming module 130. The control application can execute at least one configuration change instruction for changing or updating a configuration of the computer system 110.

Alternatively, the policy application module 120 executes at least one configuration change instruction using the scripts on the page referenced by the link. The policy application module 120 checks for correct functionality of the computer system after application of the security policy. The scripts can be implemented using Java, Ajax, JavaScript commands, ActiveX libraries, Net Framework, and so on. The scripts are formed by the policy application module 120. The scripts can collect data reflecting the type and the state of the computer system 110 and provide this data to the instruction forming module 130. The scripts can execute at least one configuration change instruction for change in configuration of the computer system 110. An example of such a script, as discussed herein, relates to the scenario of launching the Windows Notepad using the ActiveX library:

```
<script language ="javascript">
var WshShell = new ActiveXObject("WScript.Shell");
WshShell.Run ("notepad",2);
```

</script> According to the exemplary embodiment, the instruction forming module 130 selects a security policy from the policy database 140 applicable to the computer system 110 based on its configuration. The instruction forming module 130 generates at least one instruction for change in configuration of the computer system 110 according to the security policy. The instruction forming module 130 provides the instruction(s) to the policy application module 120. The database 140 stores security policies used within the corporate infrastructure.

The instruction forming module 130 receives data reflecting the configuration of the computer system 110 and selects the security policy from the database 140 based on the configuration of the computer system 110. Then, the instruction forming module 130 generates executable instructions for change in configuration of the computer system 110.

An example of configuration action can be an update of a particular application or of the entire OS and changing of its current parameters, for example, a registry entry value. For example, MICROSOFT™ Outlook 14.0.7109.5000 SP1 Home edition without plug-ins is detected on the computer system 110. According to the security policy, the user must use MICROSOFT™ Outlook version 14.0.7109.5000 SP2 Corporate edition with Attachments Processor plug-in. Thus, the Outlook needs to be updated to a newer version and Attachments Processor plug-in needs to be installed. Additionally, devices (e.g., network card and VPN connection) may need to be re-configured.

For example, an action for update of MICROSOFT™ Outlook can be implemented as an algorithm:

1. Un-install a current version of MICROSOFT™ Outlook 14.0.7109.5000 SP1 Home edition.
2. Install required version of MICROSOFT™ Outlook 14.0.7109.5000 SP2 Corporate edition.

A configuration change instruction is generated based on the algorithm. The files and application distributives are determined (e.g., a distributive with a required version of Outlook). The re-configuration actions can be described by different algorithms. For example, the algorithm for updating MICROSOFT™ Outlook can be implemented as follows:

1. Delete files related to an old version of MICROSOFT™ Outlook;
2. Delete changes in OS (registry, services, libraries, etc.) related to the old version of MICROSOFT™ Outlook;
3. Write files related to a new version of MICROSOFT™ Outlook with the installed plug-in Attachments Processor;
4. Create changes recorded in the OS (registry, services, libraries, etc.) related to a new version of MICROSOFT™ Outlook with the installed plug-in Attachments Processor.

An instruction based on the above algorithm is executed. This instruction can reference the files of the new version of MICROSOFT™ Outlook with the installed plug-in Attachments Processor. The instruction can include sub-functions that implement changes in the OS. The distributive files can be stored in open sources or in the applications' database 150. The database 150 stores files, scripts, applications' descriptions used in a corporate network.

A configuration change instruction forces at least one action on the computer system. Examples might be:

```
1. XCOPY c:\!!!!\1\*.* c:\!!!!\2\*.* /E
   del c:\!!!!\1\*.* /f /s /q
2. Windows Registry Editor Version 5.00
   Turn off recent documents:
   [HKEY_CURRENT_USER\Software\Microsoft\Windows\
CurrentVersion\Policies\Explorer] ;
       "NoRecentDocsMenu"=hex:01,00,00,00
```

According to the exemplary embodiment, several instructions may be required for change in configuration of the computer system 110 according to the selected security policy. Based on a re-configuration algorithm, the instructions can be packaged and sent as a self-starting archive or package. The archive (or package) can include files and distributives from the applications database 150. The instruction forming module 130 generates the instructions and provides them to the policy application module 120. The policy application module 120 changes the configuration of the computer system 110 by executing the instructions according to the selected security policy.

According to one embodiment, a control application can be used for configuration of the computer system 110. The policy application module 120 executes at least one configuration change instruction using the control application. Alternatively, the policy application module 120 starts configuration scripts on the page. The instructions can be self-unpacking and auto-executable. The policy application module 120 sends to the computer system self-unpacking instructions for change in configuration of the computer system 110. Additionally, the policy application module 120 can check the functionality of the computer system 110 after application of the selected security policy and acceptance of the computer system into the corporate network.

Figure 2:
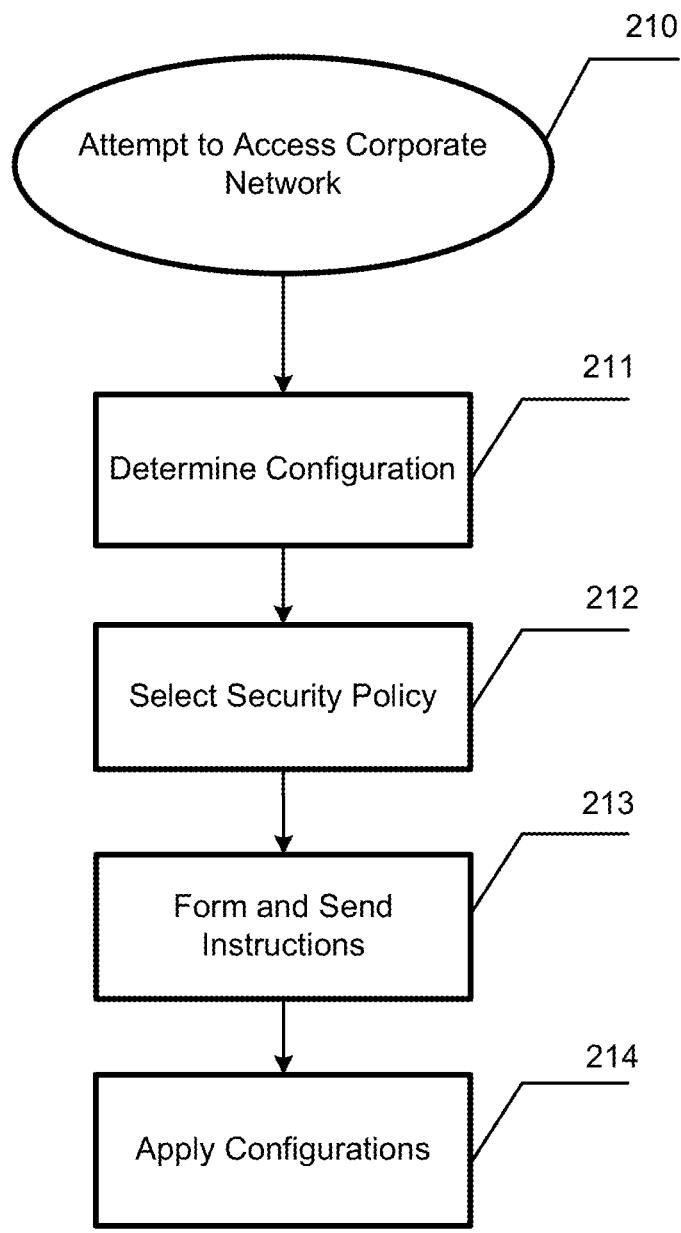
FIG. 2 illustrates an algorithm for configuration of a computer system, in accordance with the exemplary embodiment.

FIG. 2 illustrates an algorithm for configuration of a computer system, in accordance with the exemplary embodiment. In step 210, a user begins to work with the computer system 110 and attempts to access a corporate network. In step 211, the policy application module 120 determines configuration of the computer system 110. In step 212, the instruction forming module 130 selects a security policy applicable to the computer system 110 based on its configuration and existing policies. In step 213, the instruction forming module 130 forms at least one instruction for change in configuration of the computer system 110 based on the selected security policy. In step 214, the policy application module 120 configures the computer system 110 according to the security policy by executing at least one configuration change instruction.

Figure 3:
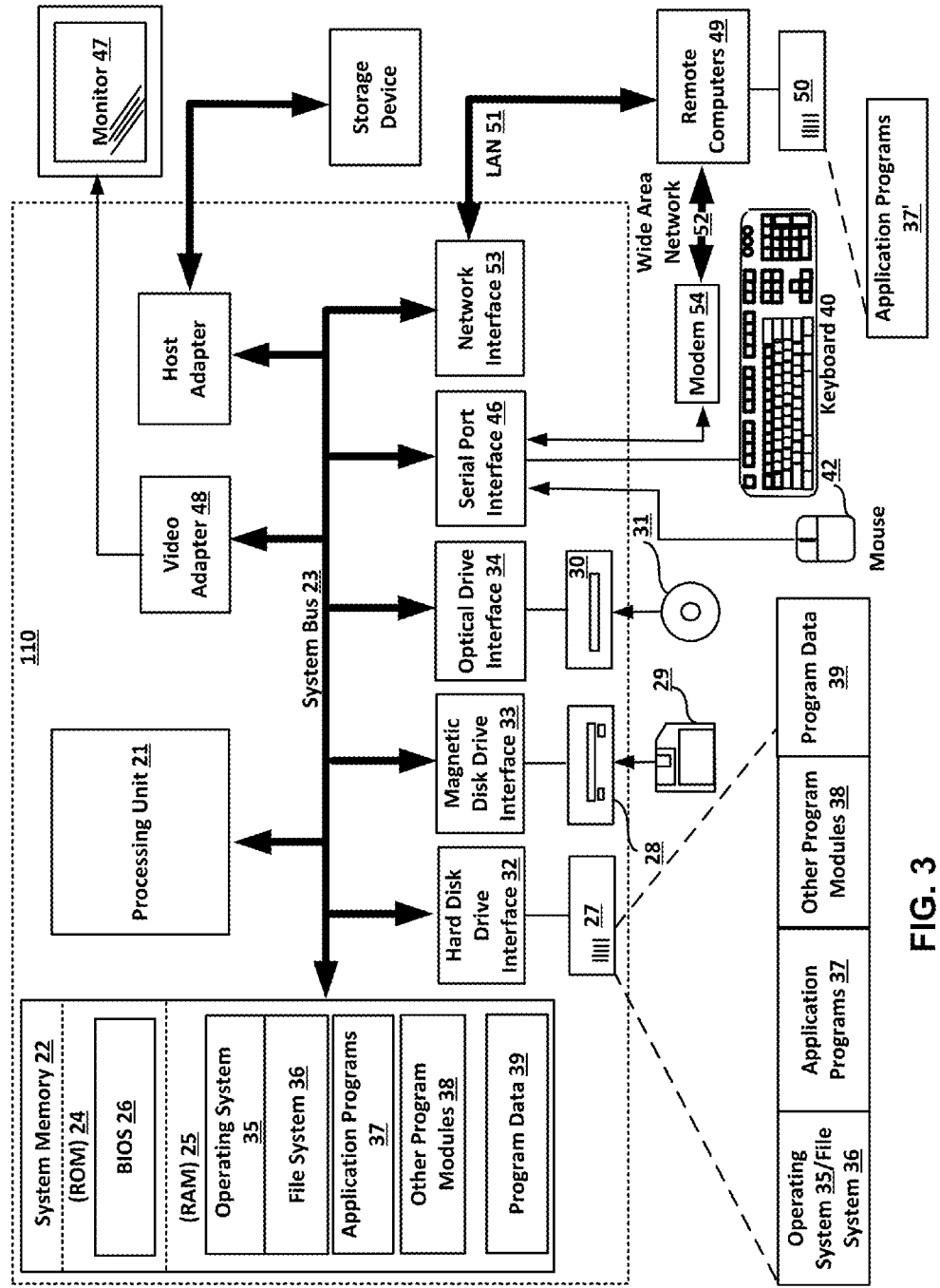
FIG. 3 illustrates a schematic of an exemplary computer system or a server that can be used for implementation of the invention.

With reference to FIG. 3, an exemplary system for implementing the invention includes a general purpose computing device in the form of a computer system/server 110 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 110, such as during start-up, is stored in ROM 24.

The computer 110 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 110.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 110 includes a file system 36 associated with or included within the operating system 35, one or more application programs 37, other program modules 38 and program data 39. A user may enter commands and information into the computer 110 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 110 may operate in a networked environment using logical connections to one or more remote computers 49. The remote computer (or computers) 49 may be another computer, a server, a router, a network PC, a peer device or other common network node, and typically includes many or all of the elements described above relative to the computer 110, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 110 is connected to the local network 51 through a network interface or adapter 53. When used in a WAN networking environment, the computer 110 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 110, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for efficient configuration of the employee's computer system according the security policies of the corporate network.

It should also be appreciated that various modifications, adaptations and alternative embodiments thereof may be made within the scope and spirit of the present invention. The invention is further defined by the following claims.

What is claimed is:

1. A computer-implemented system for automated configuration of a computer system according to a security policy, the system comprising:
    at least one computer system having at least one installed application attempting to access a network;
    a policy application module configured to acquire configuration data from the computer system prior to the computer system being permitted network access;
    an instruction forming module configured to generate at least one configuration change instruction based on the configuration data provided by the policy application module;
    a security policies database accessible by the policy application module;
    an applications database accessible by the instruction forming module,
    wherein:
        the instruction forming module generates at least one configuration change instruction and provides it to the policy application module; and
        the policy application module executes the configuration change instruction on the computer system and implements a change in the configuration of an operating system of the computer system defined by the configuration change instruction,
        wherein the policy application module sends, to the computer system, a link for determination of a type and a state of the computer system,
        wherein the link points to a location of a control application configured to determine configuration of the computer system, and
        wherein the policy application module executes at least one configuration change instruction using the control application.

2. The system of claim 1, wherein the policy application module uninstalls an old version of the application form the computer system prior to execution of the configuration change instruction.

3. The system of claim 1, wherein the policy application module checks functionality of the computer system after execution of the configuration change instruction.

4. The system of claim 1, wherein the configuration data comprises a type of the computer system and a state of the computer system.

5. The system of claim 4, wherein the state of the computer system indicates any of:
   state of an operating system;
   versions of installed applications; and
   presence of plug-ins.

6. The system of claim 1, wherein the link points to a page containing scripts that determine configuration of the computer system.

7. The system of claim 6, wherein the policy application module executes at least one configuration change instruction using the scripts.

8. The system of claim 1, wherein the instruction forming module acquires applications distributives from an application database and provides the application distributives to the policy application module.

9. The system of claim 1, wherein the change in configuration includes any of:
   installation of a new application;
   update of an existing application;
   update of an operating system;
   update of a DLL;
   deletion of files;
   addition of files; and
   changes to system registry.

10. A computer-implemented method for configuration of a computer system according to a security policy, the method comprising:
   detecting an attempt to access a network by a computer system;
   acquiring a current configuration data of the computer system;
   selecting a security policy based on the configuration data;
   generating at least one configuration change instruction based on the security policy and the configuration data; and
   executing the configuration change instruction on the computer system to change a configuration of an operating system of the computer system prior to the computer system being permitted network access,
   wherein:
      the execution of the configuration change instruction comprises acquiring applications distributives from an application database and providing the application distributives to the policy application module; and
      the execution of the configuration change instruction comprises installing applications defined by the configuration change instruction on the computer system,
      wherein the policy application module sends, to the computer system, a link for determination of a type and a state of the computer system,
      wherein the link points to a location of a control application configured to determine configuration of the computer system, and
      wherein the policy application module executes at least one configuration change instruction using the control application.

11. The method of claim 10, further comprising uninstalling old versions of application form the computer system prior to execution of the configuration change instruction.

12. A non-transitory computer-useable medium storing computer code for implementing the steps of:
   detecting an attempt to access a network by a computer system;
   acquiring a current configuration data of the computer system;
   selecting a security policy based on the configuration data;
   generating at least one configuration change instruction based on the security policy and the configuration data; and
   executing the configuration change instruction on the computer system to change a configuration of an operating system of the computer system prior to the computer system being permitted network access,
   wherein:
      the execution of the configuration change instruction comprises acquiring applications distributives from an application database and providing the application distributives to the policy application module; and
      the execution of the configuration change instruction comprises installing applications defined by the configuration change instruction on the computer system,
      wherein the policy application module sends, to the computer system, a link for determination of a type and a state of the computer system,
      wherein the link points to a location of a control application configured to determine configuration of the computer system, and
      wherein the policy application module executes at least one configuration change instruction using the control application.

* * * * *